United States Patent
Lai et al.

(10) Patent No.: US 7,925,872 B2
(45) Date of Patent: Apr. 12, 2011

(54) METHOD AND APPARATUS FOR USING A DIRECTORY SERVICE TO FACILITATE CENTRALIZED DEVICE NAMING

(75) Inventors: Yonghong Lai, San Jose, CA (US); Shudong Zhou, Fremont, CA (US); David A. Butterfield, Broomfield, CO (US)

(73) Assignee: Oracle America, Inc., Redwood Shores, CA (US)

( * ) Notice: Subject to any disclaimer, the term of this patent is extended or adjusted under 35 U.S.C. 154(b) by 1151 days.

(21) Appl. No.: 11/500,795

(22) Filed: Aug. 7, 2006

(65) Prior Publication Data

US 2008/0043973 A1 Feb. 21, 2008

(51) Int. Cl.
*G06F 15/177* (2006.01)
*G06F 9/00* (2006.01)
(52) U.S. Cl. .............. 713/1; 713/100; 709/220
(58) Field of Classification Search .............. 713/1, 100; 709/220
See application file for complete search history.

(56) References Cited

U.S. PATENT DOCUMENTS

| | | | |
|---|---|---|---|
| 6,088,725 A * | 7/2000 | Kondo et al. | 709/220 |
| 6,163,806 A * | 12/2000 | Viswanathan et al. | 709/229 |
| 6,647,393 B1 * | 11/2003 | Dietterich et al. | 379/218.01 |
| 6,981,036 B1 * | 12/2005 | Hamada | 709/223 |
| 7,484,055 B1 * | 1/2009 | Gupta et al. | 711/156 |
| 7,523,139 B1 * | 4/2009 | Kemkar et al. | 1/1 |
| 2004/0010563 A1 * | 1/2004 | Forte et al. | 709/215 |
| 2006/0136628 A1 * | 6/2006 | Choi | 710/72 |
| 2008/0151778 A1 * | 6/2008 | Venkitaraman et al. | 370/254 |

* cited by examiner

*Primary Examiner* — Suresh K Suryawanshi
(74) *Attorney, Agent, or Firm* — Park, Vaughan, Fleming + Dowler LLP

(57) ABSTRACT

One embodiment of the present invention provides a system that uses a directory service to facilitate centralized device naming. The system operates by receiving a registration of a device at a computer system. Next, the system determines if the device has been registered with the directory service. If so, the system retrieves a name of the device from the directory service. If not, the system generates a device name for the device, and registers the device name with the directory service.

20 Claims, 3 Drawing Sheets

METHOD AND APPARATUS FOR USING A DIRECTORY SERVICE TO FACILITATE CENTRALIZED DEVICE NAMING

RELATED APPLICATION

The subject matter of this application is related to the subject matter in U.S. Pat. No. 7,711,946 by Jerry A. Gilliam, Yonghong Lai, and Shudong Zhou, entitled, entitled "METHOD AND APPARATUS FOR USING FILESYSTEM OPERATIONS TO INITIATE DEVICE NAMING," which was filed on the same day as the instant application.

BACKGROUND

1. Field of the Invention

The present invention relates to operating systems for computers. More specifically, the present invention relates to a method and an apparatus for using a directory service to facilitate centralized device naming.

2. Related Art

Recent advances in networking technologies and distributed operating systems have enabled computer systems to share network-attached devices, such as printers, disk drives, and scanners. This type of sharing can significantly increase device utilization and at the same time can reduce overall system cost.

In order to effectively use these network attached devices (as well as devices that are attached directly to computer systems, but are shared on a network) it is important for these network-attached devices to have the same name on each machine that uses these devices.

However, in many operating systems, centralized device naming is not supported, or is only supported with extensive overhead and cost. Hence, for many organizations, it is simply not cost effective (or they do not possess the expertise necessary) to implement centralized device naming.

Hence, what is needed is a method and an apparatus for supporting centralized device naming without the problems listed above.

SUMMARY

One embodiment of the present invention provides a system that uses a directory service to facilitate centralized device naming. The system operates by receiving a registration of a device at a computer system. Next, the system determines if the device has been registered with the directory service. If so, the system retrieves a name of the device from the directory service. If not, the system generates a device name for the device, and registers the device name with the directory service.

In a variation on this embodiment, registering the device name with the directory service involves creating a registration record in a format specified by the directory service, and transferring the registration record to a server that is running the directory service.

In a further variation, the server is a database server. Transferring the registration record to the server involves saving the record on the database server.

In a variation on this embodiment, the directory service can include a Lightweight Directory Access Protocol (LDAP) service, a Network Information Service (NIS), a Network Information Service Plus (NIS+) service, a Novell eDirectory service, a Red Hat Directory Server service, an Active Directory (AD) service, an Open Directory service, an Apache Directory Server service, and an Oracle Internet Directory service.

In a variation on this embodiment, upon registering the device name with the directory service, the directory service sends a copy of the device name registration to a second computer system.

In a variation on this embodiment, the system sends a request to the directory service requesting a copy of a plurality of registration records from the directory service. The system then caches a local copy of the plurality of registration records at the computer system.

In a variation on this embodiment, the device can be physically attached to the computer system, or can be coupled to the computer system via a network.

In a variation on this embodiment, the device can include a physical device or a virtual device.

In a variation on this embodiment, the system receives an indication that the device has been removed from the computer system. The system then invalidates the registration of the device name with the directory service.

In a further variation, upon invalidating the registration of the device name with the directory service, the directory service sends a copy of the invalidation of the device name registration to a second computer system.

DETAILED DESCRIPTION

Figure 1:
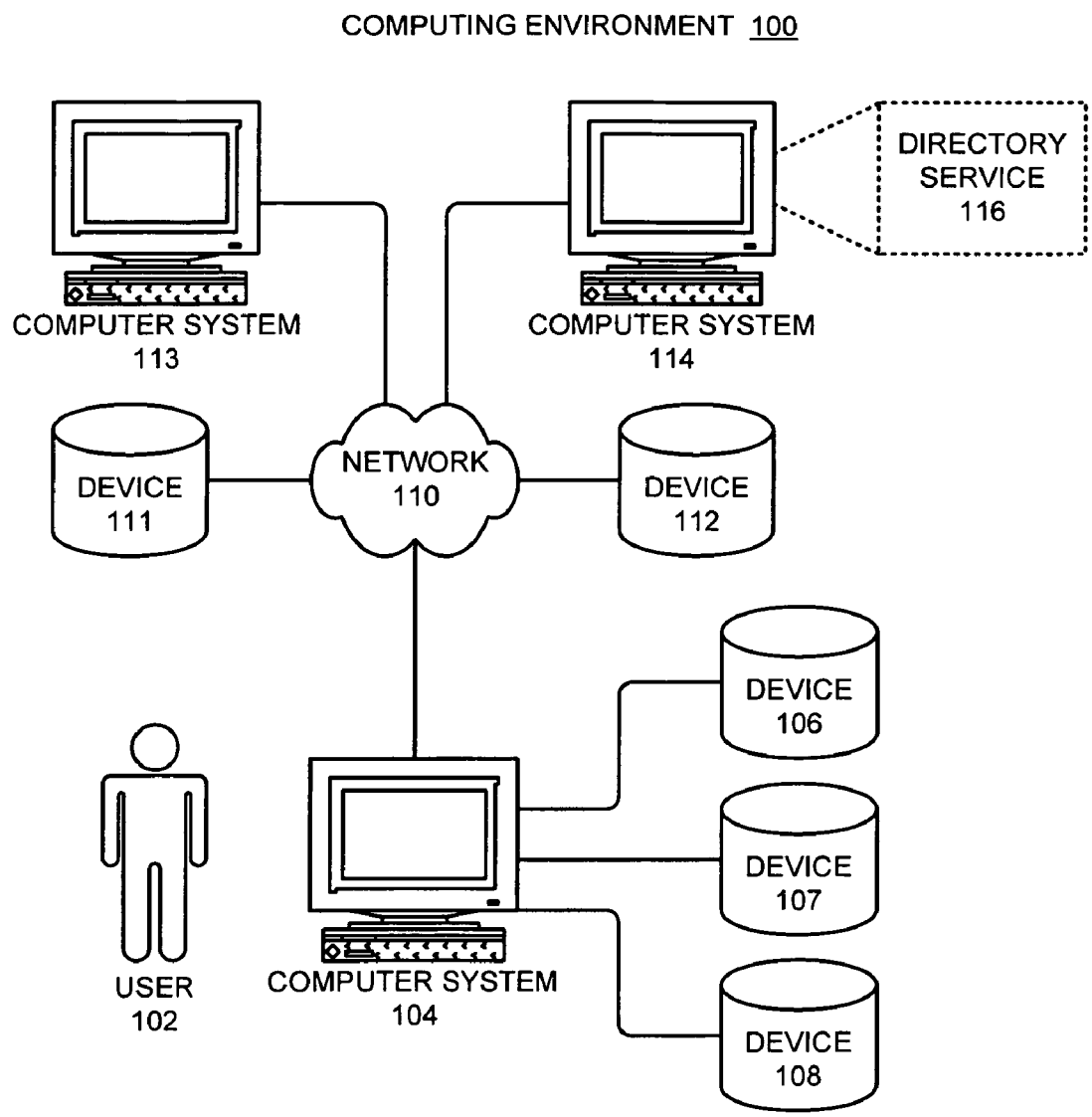
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

In operating systems, such as Solaris™ devices are typically represented in two namespaces: /dev and /devices. The /devices namespace represents the physical path to a hardware device, a pseudo device, or a bus nexus device. It reflects the kernel device tree and is managed by the devfs filesystem. However, the /dev namespace includes logical device names used by applications. The names are either symbolic links to the physical path names under /devices or, in rare cases, device special files created via the mknod(1M) command or the mknod(2) system call. Most of the /dev names are automatically generated by devfsadmd(1M) in response to physical device configuration events. These naming rules are then delivered by driver developers through link generator modules for devfsadm and entries in /etc/devlink. tab. Note that it is also possible for system administrators and applications to create device special files and symbolic links directly, bypassing the devfsadm framework. Also note that while the detailed description uses Solaris™ as an example, the present invention is not meant to be limited to the Solaris™ operating system.

The global /dev namespace resides under the system root /dev directory. Some Solaris™ applications, like ftpd, create a chroot'ed environment and export a restricted subset of the system device names into its chroot'ed /dev directory. Solaris™ zones create virtualized Solaris™ instances and provide a subset of the system device names inside the virtualized /dev namespace.

Today, Devfsadm(1M), coordinating with link generators and /etc/devlink.tab, has been the standard way to update the global /dev namespace in response to kernel device autoconfiguration events. With the increasing need in the flexible device naming area, this static device naming approach does not adapt well. One major drawback has been noticed in the past: the static device naming does not support network centric device naming. Devfsadm(1M) creates /dev names locally because the rules in either link generators or /etc/devlink.tab are local to the host. The same hardware may be named differently on two hosts, even when the device location is not changed. For example, this is what happens to a tape drive when it is used in a Storage Area Network (SAN) environment. There have been efforts in using the /etc/devlink.tab mechanism, which is able to get the same name for the same tape device. The approach still has some distance from what the customers asked for because the /etc/devlink.tab, and its contents, still live locally on each host. Maintaining a consistent copy of /etc/devlink.tab on all the networked hosts is not a trivial task.

Computing Environment

FIG. 1 illustrates a computing environment 100 in accordance with an embodiment of the present invention. Computing environment 100 includes user 102, computer system 104, computer system 113, and computer system 114. Computer system 104, computer system 113, and computer system 114 can generally include any type of computer system, including, but not limited to, a computer system based on a microprocessor, a mainframe computer, a digital signal processor, a portable computing device, a personal organizer, a cell phone, a device controller, or a computational engine within an appliance. In one embodiment of the present invention, computer system 104, computer system 113, and computer system 114 are running the Solaris™ operating system with the dev file system.

Computer system 104, computer system 113, and computer system 114 are coupled to network 110. Network 110 can generally include any type of wired or wireless communication channel capable of coupling together computing nodes. This includes, but is not limited to, a local area network, a wide area network, or a combination of networks. In one embodiment of the present invention, network 110 includes the Internet.

Device 106, device 107, and device 108 are coupled to computing system 104. Device 111 and device 112 are coupled directly to network 110. Devices 106-108 and devices 111-112 can include any type device that can be coupled to a computer system. This includes, but is not limited to, magnetic, optical, or magneto-optical storage devices, as well as storage devices based on flash memory and/or battery-backed up memory, printers, network interface cards, input devices, display devices, audio devices, and video devices.

Computer system 114 includes directory service 116. Directory service 116 can include a Lightweight Directory Access Protocol (LDAP) service, a Network Information Service (NIS), a Network Information Service Plus (NIS+) service, a Novell eDirectory service, a Red Hat Directory Server service, an Active Directory (AD) service, an Open Directory service, an Apache Directory Server service, and an Oracle Internet Directory service.

Device Name Resolution

Figure 2:
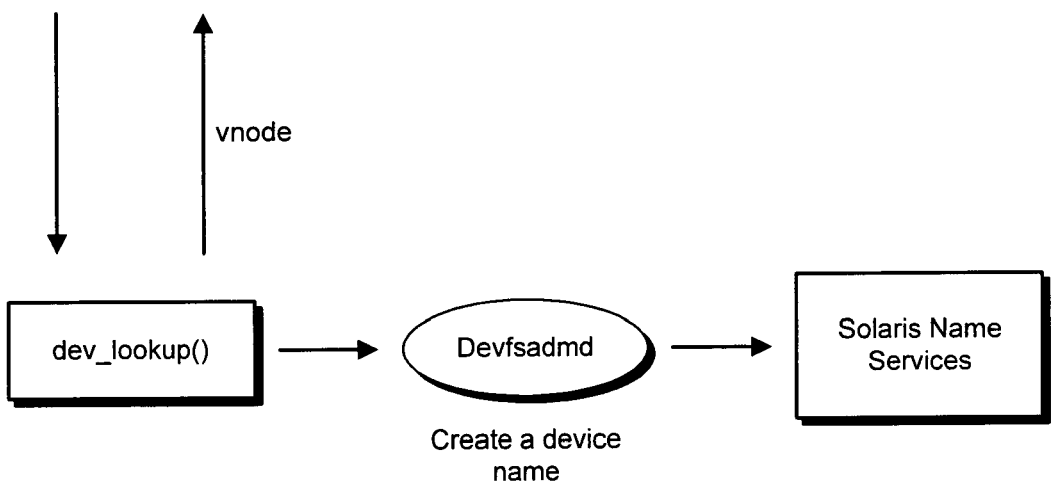
FIG. 2 illustrates a device name resolution process in accordance with an embodiment of the present invention.

FIG. 2 illustrates a device name-resolution process in accordance with an embodiment of the present invention.

The dev file system provides a dynamic environment that can be deployed to solve most of the problems listed previously. The key is the middle-man position of the file system that intercepts all the /dev device name lookups, i.e. vop_lookup( ), which is searching the /dev or a /dev subdirectory for a path-name component matching the supplied relative path-name string. The dev file system allows a customized name resolution mechanism to be registered for individual subdirectory and applies the customized name resolution mechanism to resolve all the path-names inside the same subdirectory.

FIG. 2 illustrates how the dev file system vop_lookup( ) works to handle the co-existing device name resolution mechanism varieties. Note that the Devfsadm mechanism exists today and continues to work with the new architecture of the present invention. Additions are the Directory Based Name Resolution (DBNR) agents, which provide the directory specific customized name resolution, Solaris™ name services, which provide the centralized storage of device name binding scheme, and in-kernel devfs file system interaction, which extends the dynamic kernel device tree configuration feature to the /dev layer.

The dev_lookup( ) is the entry point that resolves a /dev path-name according to its residing directory. Like the rest of the other vfs based file systems, searching a path-name component string starts with the top of the file system, i.e. the /dev directory, continues to the next layer of the /dev subdirectories, and so on. By default, resolved /dev names are also cached in the memory organized similar to the on-disk file system hierarchical structure. Unlike other vfs file system, dev_lookup( ) is implemented to be smarter than just searching the directory cache and looking up the backing store for the path-name. The dev file system keeps an internal switch table, which associates a /dev subdirectory to a vectored routine that implements its individual name resolution scheme. If available, the vectored name resolution scheme is applied to resolve all the path-names inside the subdirectory.

To gain device [re]naming flexibilities, a Solaris™ subsystem can deliver a customized name resolution routine into the dev file system switch table. The DBNR dispatching works well when the /dev subdirectory is a collection of all the device names that represent the same type of devices which follow the same device naming scenario. Existing /dev namespaces exhibit such a tendency, which include a group of subdirectories with each representing a different type of device. For example, /dev/rmt represents all the tape devices on the system. It is worth mentioning that current /dev namespace do not have subdirectories for all the Solaris™ supported device classes. In practice, a project normally creates a /dev subdirectory to host all the devices that are interested to the subsystem the project is supporting.

There are several advantages to decoupling the device naming scheme from the file system device name resolution framework, i.e. dev_lookup( ). The default file system lookup routine, i.e. dev_lookup( ), can be simple and generic, and the DBNR routine, i.e. subdir_lookup( ), can be tailored to fit the device owning subsystem needs. For example, in one embodiment of the present invention, in a shared SAN environment, the same tape device needs to be named the same on all the hosts, such as computer system 104 and computer system 113, so that the backup software can be configured consistently across the enterprise. The existing solution is to put an identical copy of /etc/devlink.tab on all Solaris hosts. However, this is not convenient and it is easy to make mistakes. It is ideal to put a single copy of the /etc/devlink.tab on a centralized name server.

Devname and Name Services

In one embodiment of the present invention, the dev file system provides the opportunity to associate a /dev subdirectory with an individual naming scheme. Thus, it is possible to have a /dev subdirectory for which all the names can be resolved through contacting a name service that stores all the device name binding rules. For example, the local /etc/devlink.tab copies can be moved into a name service database. A local host retrieves a named device entry from the name service database. The retrieved entry is guaranteed to be consistent across all the hosts. In order to do this, the following components are involved when the dev file system intercepts a device name resolution request:

- The /dev subdirectory. From the implementation perspective, a dedicated subdirectory is recommended. For example, /dev/tape can be used to host all the name service named tape drives. In the case of mixing the name service named tape drives with the devfsadm named tape drives, extra work is needed to enhance the tape link generators to handle two types of tape names. The following discussion focuses on a dedicated subdirectory for the name services named devices.
- The subdir_lookup( ) routine that transports the file system vop_lookup( ) requests to userland name services, and creates the file system node upon returning from a successful name service query. The project implements a generic name service lookup routine, i.e. devname_nslookup( ) through a plug-in module. By default, this module is not loaded until a /dev subdirectory is configured to be using any of the name services.
- The userland process that receives the devname_nslookup ( ) requests from the kernel, dispatches the lookup requests to the configured name service subsystem, i.e. /etc/nsswitch.conf, and transports the name service query results back down to the kernel. In order to do this, devfsadmd(1M) is enhanced to support a door for the communication between the dev file system and devfsadm daemon.
- The name binding rules to be stored in the name services. Similar to devfsadm link generators, these rules are specific to device types, and provided by the device supporting subsystem. Note, the present invention is not intended to make assumptions about a particular type of device naming scheme. Delivering the end user benefits should come in future projects that define the device type specific name binding scheme, define device name creation protocols between the binding rules and the in-kernel device name creation inside devname_nslookup ( ) and provide easy to use sysadmin tools.

Devname NIS Support

When one talks about Network Information Service (NIS) name services, one pictures the NIS server, NIS client, /etc/nsswitch.conf file, and of course, the software that is using the database stored on the server. Normally, these pieces fit together when the software needs a piece of information stored in the database. When the software initiates a request to the NIS client, the NIS client in turn gets the requested item from the remote server and passes the result back to the software. The "devname" keyword implementation follows the same scenario. The following is how each piece exists in one embodiment of the present invention:

- NIS server—no implementation changes other than adding the map databases;
- NIS client (or the /usr/lib/nss_nis.so.1 library)—no implementation changes;
- Name service switch—no implementation changes other than adding the new "devname nis" entry on NIS client hosts; and
- Devname subsystem—This is where the "devname" keyword is implemented and the master configuration map, i.e. "devname_master" and directory configuration maps, e.g. "tapes," information are consumed.

Since there are no implementation changes in other components than devname subsystem in this embodiment of the present invention, the devname subsystem is discussed here in more detail. The devname subsystem includes the following pieces from the perspective of being a NIS client consumer: Libdevinfo Library Interfaces, Enhanced Devfsadm Daemon, and Kernel Components Requesting Name Service Lookups.

Libdevinfo Library Interfaces

Listed here are the new Application Programming Interfaces (APIs) developed for userland applications, in this case, the Devfsadm daemon, to establish the communication with name service and retrieve map entries from a NIS database. They are:

- di_devname_ns_setup—establish the connection between the application and name services;
- di_devname_get_mapinfo—Retrieve all entries from the named NIS map; and
- di_devname_get_mapent—Retrieve a named entry from the named NIS map.

Note, these APIs are implemented in such a way that all the name service communication details are hidden from the calling applications. The NIS APIs are called within the di_devname_xxx interfaces. Also note, these APIs are designed to be extendable to work with other name services, like LDAP. The reason is that the libdevinfo APIs keep an internal switch table. Future projects can implement a LDAP routine and vector the LDAP routine into the switch table. When the system is configured as a LDAP client, these APIs automatically vectors into the LDAP routine and calls into LDAP interfaces accordingly. This second layer of name service switch, if the /etc/nsswitch.conf is the first layer, is transparent to the API callers.

Enhanced Devfsadm Daemon

As discussed previously, Devfsadmd is functioning as the bridge between the userland name services and the kernel dev filesystem. In order to do this, Devfsadmd creates a new door. The purpose of this door is to handle the name service lookup requests from the dev file system. When the door is created, Devfsadm daemon establishes a communication with the name service switch through the di_devname_ns_setup library call.

Upon receiving a name service lookup request, Devfsadm daemon fetches the named entry or the named map by making the di_devname_get_mapent or di_devname_get_mapinfo library calls. In the end, Devfsadm daemon passes the results from the NIS database down to the dev file system through the door_return( ) calls.

Kernel Components Requesting Name Service Lookups

As discussed previously, a name service lookup routine, i.e. devname_nslookup( ) is implemented to handle the communication between userland devfsadm daemon and kernel file system. A /dev subdirectory may choose to store all the naming scheme in a NIS map. Thus, the devname_nslookup ( ) is invoked to resolve a device name in such a directory with following steps: The name lookup request travels to userland devfsadmd that calls the libdevinfo APIs, in which the name lookup request is translated into a NIS database query. The query is then passed to the NIS subsystem on the local host, which forwards the query to remote NIS server. In the end, the name binding information stored in the database is retrieved travels the opposite direction to eventually come back to the dev file system and is consumed by the file system, coordinating with devname_nslookup( ) to create the resolved device name.

Centralized Device Naming

Figure 3:
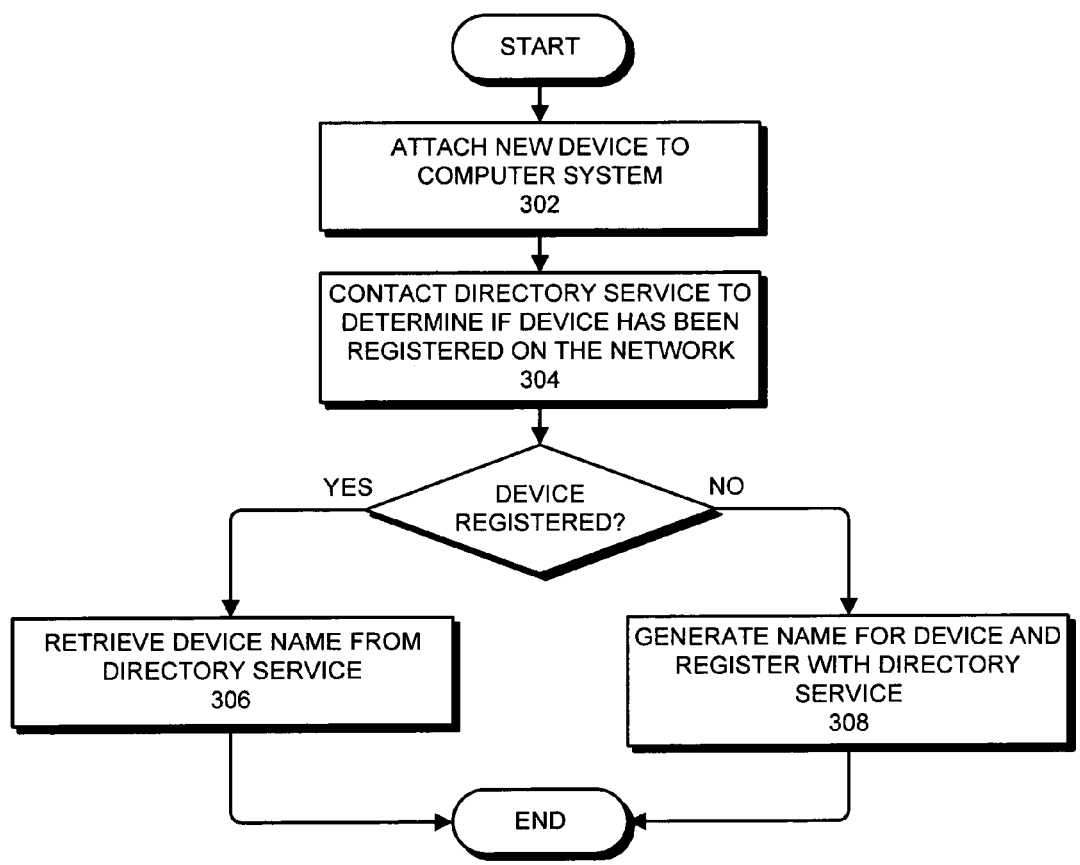
FIG. 3 presents a flowchart illustrating the process of centralized device naming in accordance with an embodiment of the present invention.

FIG. 3 presents a flowchart illustrating the process of centralized device naming in accordance with an embodiment of the present invention. The system starts when user 102 attaches a physical device, such as device 108, to computer system 104, or connects to a network-attached device, such as device 111 (step 302). Next, the system connects to directory service 116 to determine if device 111 has already been registered on network 110 (step 304). If so, computer 104 retrieves the device name for device 111 from directory service 116 (step 306).

If device 111 has not already been registered on network 110, computer system 104 generates a name for device 111, and registers the name with directory service 116 (step 308).

Note that in one embodiment of the present invention, computer system 104 includes a cache of all device names registered with directory service 116. In this embodiment, computer system 104 periodically synchronizes this cache with directory service 116. This facilitates centralized device naming at times when directory service 116 may be unavailable.

In a variation on this embodiment, as new devices, such as device 112, are registered with directory service 116, directory service 116 may proactively update the cache on all computer systems attached to network 110, such as computer system 113. Such caching strategies are well-known to those who are skilled in the art.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using a directory service on a server to facilitate centralized device naming, the method comprising:
   receiving a registration of a device at a computer system;
   determining if the device has been registered with the directory service on the server;
   if so, retrieving a name of the device from the directory service; and
   if not,
      receiving at the computer system from the directory service a set of naming rules for a device type corresponding to the device, wherein the set of naming rules comprises at least one naming rule associated with a subdirectory in which the device is hosted;
      generating at the computer system a device name for the device by using the received set of naming rules, and registering the device name with the directory service.

2. The method of claim 1, wherein registering the device name with the directory service involves:
   creating a registration record in a format specified by the directory service; and
   transferring the registration record to a server that is running the directory service.

3. The method of claim 2, wherein the server is a database server, and wherein transferring the registration record to the server involves saving the record on the database server.

4. The method of claim 1, wherein the directory service can include:
   a Lightweight Directory Access Protocol (LDAP) service;
   a Network Information Service (NIS);
   a Network Information Service Plus (NIS+) service;
   a Novell eDirectory service;
   a Red Hat Directory Server service;
   an Active Directory (AD) service;
   an Open Directory service;
   an Apache Directory Server service; and
   an Oracle Internet Directory service.

5. The method of claim 1, wherein upon registering the device name with the directory service, the directory service sends a copy of the device name registration to a second computer system.

6. The method of claim 1, further comprising:
   sending a request to the directory service requesting a copy of a plurality of registration records from the directory service; and
   caching a local copy of the plurality of registration records at the computer system.

7. The method of claim 1, wherein the device can be physically attached to the computer system, or can be coupled to the computer system via a network.

8. The method of claim 1, wherein the device can include a physical device or a virtual device.

9. The method of claim 1, further comprising:
   receiving an indication that the device has been removed from the computer system; and
   invalidating the registration of the device name with the directory service.

10. The method of claim 9, wherein upon invalidating the registration of the device name with the directory service, the directory service sends a copy of the invalidation of the device name registration to a second computer system.

11. A computer-readable storage medium storing instructions that when executed by a computer cause the computer to perform a method for using a directory service on a server to facilitate centralized device naming, the method comprising:
   receiving a registration of a device at a computer system;
   determining if the device has been registered with the directory service on the server;
   if so, retrieving a name of the device from the directory service; and
   if not,
      receiving at the computer system from the directory service a set of naming rules for a device type corresponding to the device, wherein the set of naming rules comprises at least one naming rule associated with a subdirectory in which the device is hosted;
      generating at the computer system a device name for the device by using the received set of naming rules, and registering the device name with the directory service.

12. The computer-readable storage medium of claim 11, wherein registering the device name with the directory service involves:

creating a registration record in a format specified by the directory service; and transferring the registration record to a server that is running the directory service.

13. The computer-readable storage medium of claim 12, wherein the server is a database server, and wherein transferring the registration record to the server involves saving the record on the database server.

14. The computer-readable storage medium of claim 11, wherein upon registering the device name with the directory service, the directory service sends a copy of the device name registration to a second computer system.

15. The computer-readable storage medium of claim 11, wherein the method further comprises:

sending a request to the directory service requesting a copy of a plurality of registration records from the directory service; and caching a local copy of the plurality of registration records at the computer system.

16. The computer-readable storage medium of claim 11, wherein the device can be physically attached to the computer system, or can be coupled to the computer system via a network.

17. The computer-readable storage medium of claim 11, wherein the device can include a physical device or a virtual device.

18. The computer-readable storage medium of claim 1, wherein the method further comprises:

receiving an indication that the device has been removed from the computer system; and invalidating the registration of the device name with the directory service.

19. The computer-readable storage medium of claim 18, wherein upon invalidating the registration of the device name with the directory service, the directory service sends a copy of the invalidation of the device name registration to a second computer system.

20. An apparatus configured to use a directory service on a server to facilitate centralized device naming, comprising:

a receiving mechanism configured to receive a registration of a device at a computer system;

a determination mechanism configured to determine if the device has been registered with the directory service on the server;

a retrieval mechanism configured to retrieving a name of the device from the directory service if the device has been registered with the directory service; and a registration mechanism, wherein if the device has not been registered with the directory service, the registration mechanism is configured to:

receive from the directory service a set of naming rules for a device type corresponding to the device, wherein the set of naming rules comprises at least one naming rule associated with a subdirectory in which the device is hosted;

generate a device name for the device by using the received set of naming rules; and register the device name with the directory service.

\* \* \* \* \*